US010931597B2

(12) United States Patent
Johnson et al.

(10) Patent No.: US 10,931,597 B2
(45) Date of Patent: Feb. 23, 2021

(54) DYNAMICALLY DOCKING AN UNMANNED AERIAL VEHICLE

(71) Applicant: MOTOROLA SOLUTIONS, INC., Chicago, IL (US)

(72) Inventors: Eric Johnson, Chicago, IL (US); Sanida Bratt, Chicago, IL (US); Randy L. Ekl, Downers Grove, IL (US); Youngeun Kang, West Lafayette, IN (US); Yanling Xu, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 167 days.

(21) Appl. No.: 16/184,043

(22) Filed: Nov. 8, 2018

(65) Prior Publication Data
US 2020/0153755 A1     May 14, 2020

(51) Int. Cl.
| *H04L 12/911* | (2013.01) |
| *B60L 53/14* | (2019.01) |
| *B60L 53/31* | (2019.01) |
| *B60L 53/60* | (2019.01) |
| *B64F 1/12* | (2006.01) |

(Continued)

(52) U.S. Cl.
CPC ............ *H04L 47/824* (2013.01); *B60L 53/14* (2019.02); *B60L 53/31* (2019.02); *B60L 53/60* (2019.02); *B64F 1/12* (2013.01); *B64F 1/22* (2013.01); *B64F 1/362* (2013.01); *H04L 67/306* (2013.01); *B60L 2200/10* (2013.01); *B60L 2230/12* (2013.01); *B60L 2230/16* (2013.01);

(Continued)

(58) Field of Classification Search
CPC ...... H04L 47/824; H04L 67/306; B60L 53/14; B60L 53/31; B60L 53/60; B60L 2200/10; B60L 2270/40; B60L 2230/12; B60L 2230/16; B60L 53/16; B60L 53/36; B60L 2260/32; B64F 1/12; B64F 1/362; B64F 1/22; B64C 39/024; B64C 2201/127
See application file for complete search history.

(56) References Cited

U.S. PATENT DOCUMENTS

| 9,527,605 B1 | 10/2016 | Gentry et al. |
| 10,593,109 B1 * | 3/2020 | Floyd ..................... G06T 17/05 |

(Continued)

FOREIGN PATENT DOCUMENTS

| WO | 2016145411 | 9/2016 |
| WO | 2016205415 | 12/2016 |

*Primary Examiner* — Russell Frejd
(74) *Attorney, Agent, or Firm* — Michael Best and Friedrich LLP

(57) ABSTRACT

A method for docking an unmanned aerial vehicle ("UAV") equipped with a wireless communications system. The method includes coupling the UAV to a docking device that is configured to provide power and data communication to the UAV via a physical interface. The method further includes receiving, at a docking device controller, an identity of the UAV, and determining, based on the received identity of the UAV, an organization associated with the UAV. The method also includes accessing, via the docking device controller, a collaborative operating profile associated with the determined organization and the identity of the UAV. The method further includes providing access to one or more resources associated with the docking station based on the collaborative operating profile.

20 Claims, 9 Drawing Sheets

(51) Int. Cl.
*B64F 1/36* (2017.01)
*B64F 1/22* (2006.01)
*H04L 29/08* (2006.01)
*B64C 39/02* (2006.01)

(52) U.S. Cl.
CPC ......... *B60L 2270/40* (2013.01); *B64C 39/024* (2013.01); *B64C 2201/127* (2013.01)

(56) References Cited

U.S. PATENT DOCUMENTS

| | | | |
|---|---|---|---|
| 2016/0196756 A1* | 7/2016 | Prakash | G08G 5/025 701/3 |
| 2016/0304217 A1 | 10/2016 | Fisher et al. | |
| 2018/0050800 A1* | 2/2018 | Boykin | B60L 53/14 |
| 2018/0186473 A1 | 7/2018 | Erickson et al. | |
| 2018/0196418 A1* | 7/2018 | Meier | G05D 1/0225 |

* cited by examiner

US 10,931,597 B2

DYNAMICALLY DOCKING AN UNMANNED AERIAL VEHICLE

BACKGROUND OF THE INVENTION

Unmanned aerial vehicles ("UAVs") are used by many different organizations. For example, public safety agencies (police departments, fire departments, etc.) operate UAVs at incident sites. Private organizations, including private security organizations, news organizations, and others operate UAVs as well. Often, multiple UAV's belonging to multiple agencies operate in overlapping usage areas. Due to the overlapping usage areas of different organizations, allowing UAVs from different organizations to utilize the charging and communication infrastructure of other organizations provides necessary resources for the UAVs, while reducing the requirement for each agency to install and maintain a full UAV infrastructure.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
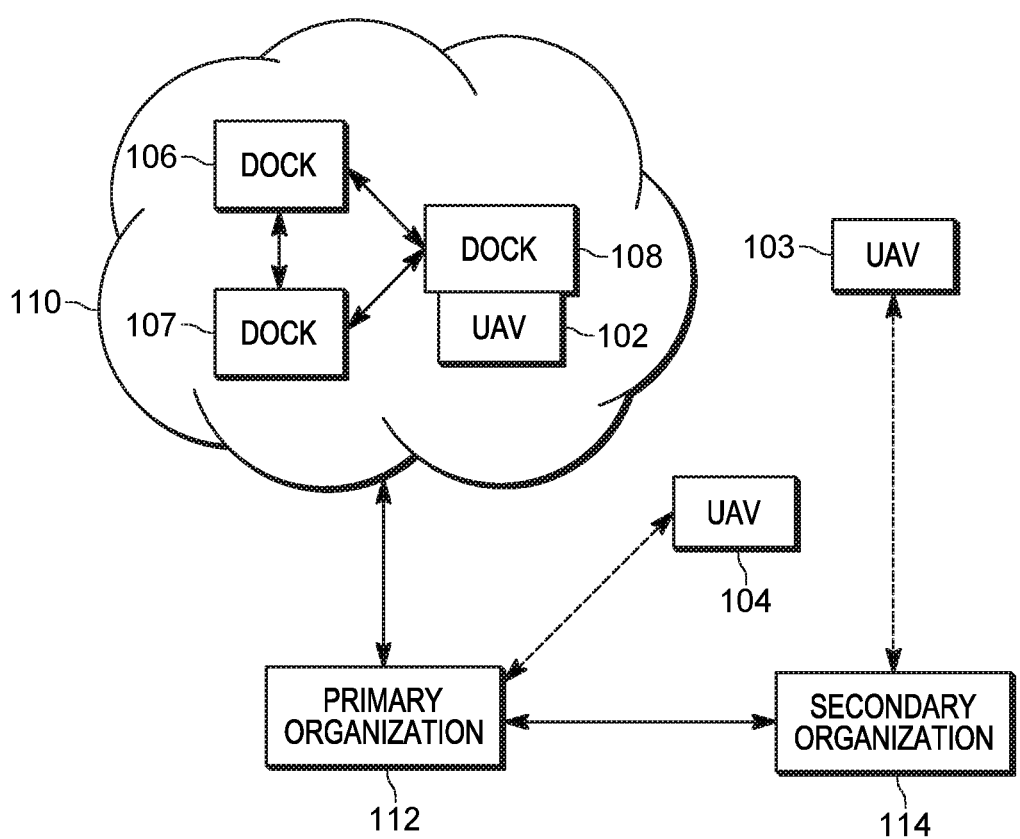
FIG. 1 is a block diagram of a multi-agency unmanned aerial vehicle (UAV) system for operating a number of UAVs associated with various agencies, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

SUMMARY

One embodiment of the disclosure provides a method for docking an unmanned aerial vehicle ("UAV") equipped with a wireless communications system. The method includes coupling the UAV to a docking device that is configured to provide power and data communication to the UAV via a physical interface. The method further includes receiving, at a docking device controller, an identity of the UAV, and determining, based on the received identity of the UAV, an organization associated with the UAV. The method also includes accessing, via the docking device controller, a collaborative operating profile associated with the determined organization and the identity of the UAV. The method further includes providing access to one or more resources associated with the docking station based on the collaborative operating profile.

Another embodiment of the disclosure provides a docking device for providing power and data communication to a UAV equipped with a wireless communication system. The docking device includes a base portion and a dock portion movably coupled to the base portion. The dock portion includes a mechanical latch for physically coupling the UAV to the docking device, and a number of electrical connections configured to interface with corresponding electrical connections on the UAV. The electrical connections include power connections and data connections. The dock portion further includes an electronic processor configured to receive an identity of the UAV via the data connections, and determine, based on the received identity of the UAV, an organization associated with the UAV. The electronic processor is further configured to access a collaborative operating profile associated with the determined organization and the received identity of the UAV, and provide access to one or more resources associated with the docking station based on the collaborative operating profile.

Another embodiment of the disclosure provides a method for docking UAVs associated with multiple organizations on a dock network. The method includes coupling a UAV to a docking device associated with a first organization, and receiving, at a docking device controller, an identity of the UAV. The method further includes determining, based on the identity of the UAV, an organization associated with the UAV, and providing access to resources associated with the first organization to the UAV based on the determined identity of the UAV.

DETAILED DESCRIPTION

FIG. 1 is a block diagram of a multi-agency UAV system 100 according to one embodiment. In the example illustrated, the system 100 includes a number of UAVs 102-104. In some embodiments, the UAVs 102-104 are pilotless aircrafts that navigate autonomously. In other embodiments, the UAVs 102-104 are pilotless aircrafts that are remote-controlled by an operator providing remote-controlled guidance. In some embodiments, the UAVs 102-104 may operate beyond the line of sight of the operator. The system also includes a number of docking devices 106-108.

In one embodiment, the docking devices 106-108 are connected in a dock network 110. The dock network may be associated with a primary organization 112 within the system 100. The primary organization 112 may be an organization with authority over of a geographic area. In other examples, the primary organization 112 may have authority over one or more aspects of a given geographic area, such as surveillance, air traffic control, etc. For example, a public security organization, such as a police department, may have specific obligations within a given geographic area, while a fire department may have other specific obligations within the same or overlapping geographic area. In one embodiment, the primary organization is the organization responsible for a UAV infrastructure, such as dock network 110. In one embodiment, the primary organization 112 is a public safety organization or agency, such as a police department, a fire department, an emergency medical services agency, etc. In other embodiments, the primary organization 112 may be a private security agency, news agency or organization, or other entity. The dock network 110 may allow for wired communication between individual docking devices 106-108, as well as between the docking device 106-108 and the primary organization 112.

In the example system 100, UAVs 103, 104 may utilize wireless communication to communicate to other devices, including docking devices 106-108 within the docking network 110. In one example, the UAV 104 communicates directly with the primary organization 112 via a wireless connection. The UAV 104 may be associated with the primary organization 112, which allows for direct communication between the UAV 104 and the primary organization 112. In another example, the UAV 103 is in communication, and is associated, with a secondary organization 114. Similar to the primary organization 112, the secondary organization 114 may be a public safety organization. In some embodiments, the secondary organization 114 is a different public safety organization than the primary organization 112, but located in the same geographical area. The different public safety organization associated with the secondary organization 114 may have different responsibilities or jurisdictional rights within the geographical area than the primary organization 112. In other embodiments, the secondary organization 114 is a different type of or the same type of public safety organization as the primary organization 112, but located in a different geographical area and/or jurisdictional area. In other embodiments, the secondary organization 114 may be a private security organization, either in the same or a different geographical location. In some embodiments, the UAV 103 communicates with the secondary organization 114 via wireless communication. The secondary organization 114 may be configured to communicate with the primary organization 112, and vice versa, via either wired or wireless connections.

The primary organization 112 and the secondary organization 114 may include various on-site and/or remote (for example, cloud-based) servers. The servers may include executable instructions, monitoring systems, databases, or any other infrastructure associated with the respective organization. In addition, the primary organization 112 and/or secondary organization 114 may include monitoring and control capability for one or more associated UAVs. In further examples, the primary organization 112 and/or secondary organization 114 include monitoring and control capability for one or more associated docking devices.

In some embodiments, UAVs 104-106 utilize a wired connection to an organization, such as primary organization 112, associated with a docking device when docked. For example, as shown in the system 100, UAV 102 is coupled to docking device 108. Provided that the UAV has the proper credentials, as will be described in more detail below, the UAV 102 may utilize the wired communication infrastructure between the docking device 108 and the primary organization 112. In other embodiments, the UAV 102 may utilize the wired communication infrastructure between the docking device 108 and the primary organization 112 to communicate with the secondary organization 114 via a wired connection. For example, the primary organization 112 may have a secured wired connection with the secondary organization 114. Upon successfully docking, the UAV 102 may be configured to transmit data to the secondary organization 114 via the wired connection to the docking device 108, and thereby the primary organization 112. The primary organization 112 may provide encryption services to encrypt data provided by the UAV 102, prior to transmitting the received data to the secondary organization 114.

Various elements of the system 100 may communicate using various wireless communication protocols. Various communication networks are used to facilitate the wireless communication, such as a cellular network (for example, 3G, 4G, 5G, LTE, etc.), a land mobile radio (LMR) network, a wireless local area network (for example, Wi-Fi, Wi-Max, etc.), a long range (LoRa) network, a wireless accessory Personal Area Network (PAN), a Bluetooth™ network, a Machine-to-machine (M2M) autonomous network, or other networks. Wired communication networks may include the Internet (for example, cable, fiber optic, etc.), a public switched telephone network, and the like. The wired and wireless communication networks described herein further contemplate and include future developed networks. Although FIG. 1 shows three docking devices and three UAVs, it is understood that more or fewer docking devices, UAVs, and organizations may be used in the system 100.

Figure 2:
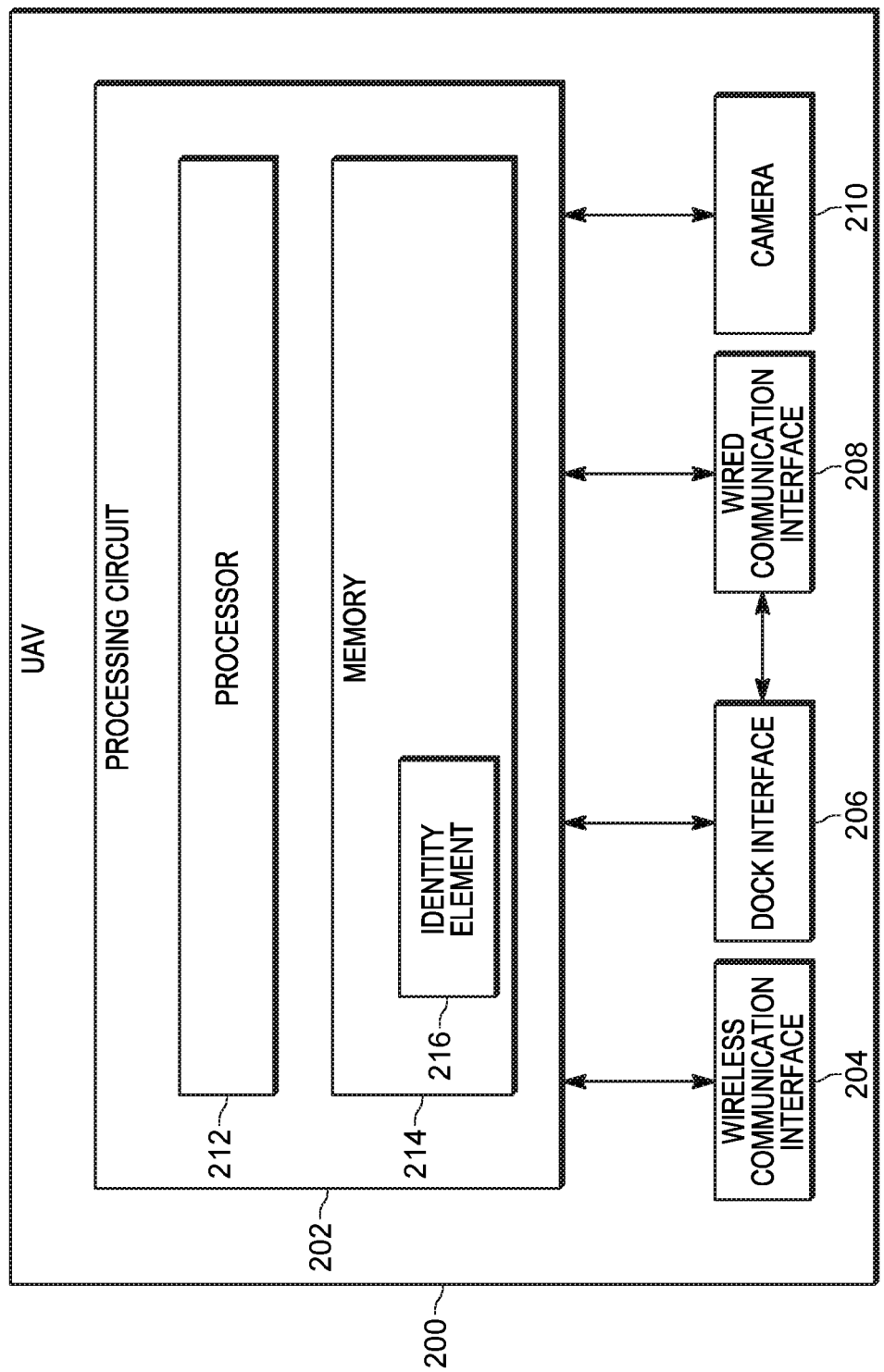
FIG. 2 is a block diagram of a UAV included in the system of FIG. 1 according to some embodiments.

FIG. 2 is a block diagram of a UAV 200 according to one embodiment. The UAV 200 may be similar to UAVs 102-104 described above. The UAV 200 includes a processing circuit 202, a wireless communication interface 204, a dock interface 206, a wired communication interface 208, and a camera 210. The processing circuit 202 may include an electronic processor 212 and a memory 214. The processing circuit 202 may be communicably connected to one or more of the wireless communication interface 204, the dock interface 206, the wired communication interface 208, and the camera 210. The electronic processor 212 may be implemented as a programmed microprocessor, an application specific integrated circuit (ASIC), one or more field programmable gate arrays (FPGA), a group of processing components, or with other suitable electronic processing components.

The memory 214 (for example, a non-transitory, computer-readable medium) includes one or devices (for example, RAM, ROM, Flash memory, hard disk storage, etc.) for storing data and/or computer code for completing or facilitating the various processes, layers, and modules described herein. The memory 214 may be or include volatile memory or non-volatile memory. The memory 214 may include database components, object code components, script components, or any other type of information structure for supporting the various activities and information structure described in the present application. According to one example, the memory 214 is communicably connected to the electronic processor 212 via the processing circuit 202 and may include computer code for executing (for example, by the processing circuit 202 and/or the electronic processor 212) one or more processes described herein.

In some embodiments, the UAV 200 may include fewer or additional components in configurations different from that illustrated in FIG. 2. For example, in some embodiments, the UAV 200 may include a global positioning system unit or a similar component that may determine the geographic coordinates of the location of the UAV 200. In some embodiments, the UAV 200 may perform functionality other than the functionality described below. In some examples, the electronic processor 212 is configured to control movement and, thus, the position, of the UAV 200. As a consequence, the combination of the UAV 200 and the camera 210 may be referred to as a self-positionable camera.

In one embodiment, the wireless communication interface 204 is configured to facilitate wireless communication between the UAV 200 and one or more external devices or systems, such as those shown in FIG. 1. The wireless communication interface 204 may be or include wireless communication interfaces (for example, antennas, transmitters, receivers, transceivers, etc.) for conducting data communications between the UAV 200 and one or more external devices, such as other UAVs, docking devices, and/or organizations, as described herein. In some embodiments, the wireless communications interface 204 utilizes one or more wireless communication protocols, such as cellular (3G, 4G, 5G, LTE, CDMA, etc.), Wi-Fi, Wi-MAX, ZigBee, ZigBee Pro, Bluetooth, Bluetooth Low Energy (BLE), RF, LoRa, LoRaWAN, Near Field Communication (NFC), Z-Wave, Radio Frequency Identification (RFID), 6LoWPAN, Thread, WiFi-ah, and/or other wireless communication protocols.

The wired communication interface 208 is configured to facilitate wired communication between the UAV 200 and one or more external devices or systems, such as a docking device described herein. The wired communication interface 208 may be or include wired communication interfaces (for example, jacks, wire terminals, ports, etc.) for conducting data communications between the UAV 200 and one or more external devices, such as docking devices described herein. The wired communication interface 208 may include wired interfaces such as Universal Serial Bus (USB), USB-C, Firewire, Lightning, CATS, universal asynchronous receiver/transmitter (UART), serial (RS-232, RS-485), etc. In some embodiments, the wireless communication interface 204 and the wired communication interface 208 may be a single communication interface within the UAV 200.

The dock interface 206 may include mechanical and/or electrical coupling points for coupling the UAV 200 to a docking device, such as the docking devices described herein. For example, the dock interface 206 may include one or more mechanical latches to allow for the UAV 200 to securely couple to a docking device. Further, the dock interface 206 may include one or more electrical connections to allow for wired communication between the UAV 200 and a docking device. The electrical connections may be associated with the one or more wired communication interfaces described above. In some embodiments, the dock interface 206 is in electrical communication with the wired communication interface 208 to facilitate wired communication between the wired communication interface 208 and a docking device, via the dock interface 206. Further, the dock interface 206 may allow for power to be provided to the UAV 200 from a docking device. Power may be provided to the UAV 200 via a wired power connection and/or a wireless power connection, such as via inductive charging. In some embodiments, the dock interface 206 may further include connections for providing one or more fuel sources to the UAV 200, such as fossil fuels (for example, gasoline, kerosene, diesel, etc.), or other fuel sources such as liquid oxygen, liquid hydrogen, or other fuel source used to power the UAV 200.

In some embodiments, the camera 210 is a panoramic camera, which may include a 360-degree field of view camera. The camera 210 may utilize hemispherical imaging or complete spherical imaging to provide a 360-degree field of view. In alternate embodiments, the camera 210 may include a plurality of cameras that individually have smaller fields of view than 360 degrees. In such embodiments, the cameras may be placed in different directions that allow for combining images from each camera to generate a field of view that is 360 degrees. In one embodiment, the camera 210 may activate one or more cameras to generate a desired field of view. In some example, the camera 210 has a fixed field of view. The camera 210 may be configured to capture still or moving images at various resolutions (for example, 1080 p, 1440 p, 4 k, etc.). In some embodiments, the camera 210 is configured to store one or more captured image data files in the memory 214.

As described above, the memory 214 may be configured to store various processes, layers, and modules, which may be executed by the electronic processor 212 and/or the processing circuit 202. In one embodiment, the memory 214 may include an identity element 216, which contains one or more parameters and/or other elements associated with the identity of the UAV 200. The identity element 216 may be transmitted by the UAV 200 to one or more other devices, such as an organization described above to confirm an identity of the UAV 200 during operation. While not shown, it is understood that the memory 214 may include various other processes, modules, and layers to facilitate operation of the UAV 200, as needed.

Figure 3:
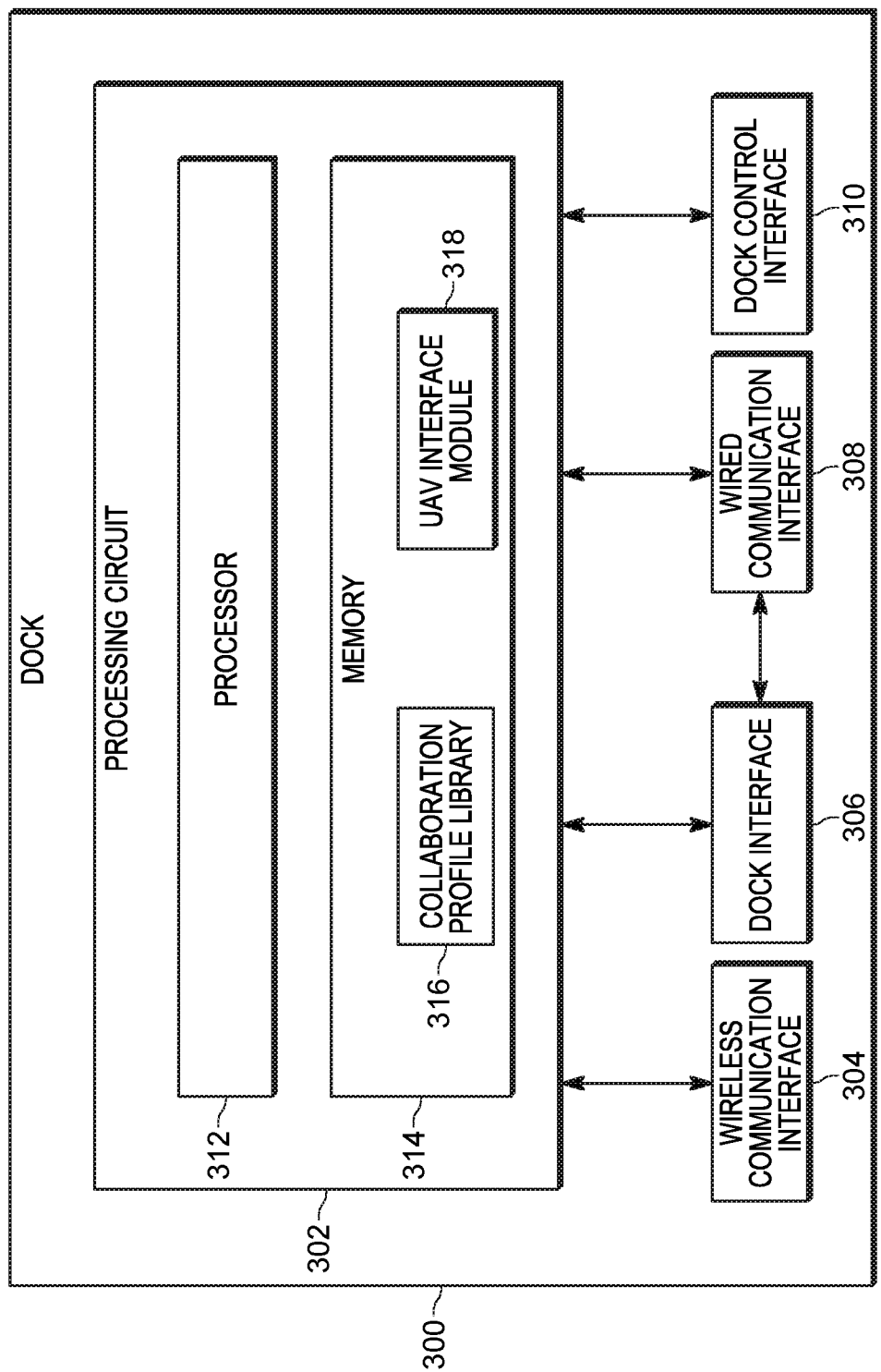
FIG. 3 is a block diagram of a docking device for a UAV included in the system of FIG. 1, according to some embodiments.

Turning now to FIG. 3, a block diagram of a docking device 300, such as docking devices 106-108, is shown according to some embodiments. The docking device 300 is shown to include a processing circuit 302, a wireless communication interface 304, a UAV interface 306, a wired communication interface 308, and a docking device control interface 310. The processing circuit 302 may include an electronic processor 312 and a memory 314. The processing circuit 302 may be communicably connected to one or more of the wireless communication interface 304, the UAV interface 306, the wired communication interface 308, and the docking device control interface 310. The electronic processor 312 may be implemented as a programmed microprocessor, an application specific integrated circuit (ASIC), one or more field programmable gate arrays (FPGA), a group of processing components, or other suitable electronic processing components.

The memory 314 (for example, memory, memory unit, storage device, etc.) includes one or devices (for example, RAM, ROM, Flash memory, hard disk storage, etc.) for storing data and/or computer code for completing or facilitating the various processes, layers, and modules described herein. The memory 314 may be or include volatile memory or non-volatile memory. The memory 314 may include database components, object code components, script components, or any other type of information structure for supporting the various activities and information structure described in the present application. According to one example, the memory 314 is communicably connected to the electronic processor 312 via the processing circuit 302 and may include computer code for executing (for example, by the processing circuit 302 and/or the electronic processor 312) one or more processes described herein.

In some embodiments, the docking device 300 may include fewer or additional components in configurations different from that illustrated in FIG. 3. In some embodiments, the docking device 300 may perform functionality other than the functionality described below. In some examples, the electronic processor 312 is configured to control one or more movements and, thus, the position of the docking device 300 and, in some examples, a UAV coupled to the docking device 300.

In one embodiment, the wireless communication interface 304 is configured to facilitate wireless communication between the docking device 300 and one or more external devices or systems, such as those shown in FIG. 1. The wireless communication interface 304 may be or include wireless communication interfaces (for example, antennas, transmitters, receivers, transceivers, etc.) for conducting data communications between the docking device 300 and one or more external devices, such as other drones, docking devices, and/or organizations, as described herein. In some embodiments, the wireless communications interface utilizes one or more wireless communication protocols, for example, one or more of the protocols mentioned herein.

The wired communication interface 308 is configured to facilitate wired communication between the docking device 300 and one or more external devices or systems, such as a UAV, other docking devices, and/or organizations described herein. The wired communication interface 308 may be or include wired communication interfaces (for example, jacks, wire terminals, ports, etc.) for conducting data communications between the docking device 300 and one or more external devices, such as UAVs, other docking devices, and/or organizations described herein. The wired communication interface 308 may include wired interfaces such as Universal Serial Bus (USB), USB-C, Firewire, Lightning, CAT5, universal asynchronous receiver/transmitter (UART), serial (RS-232, RS-485), etc. In some embodiments, the wireless communication interface 304 and the wired communication interface 308 may be a single communication interface within the docking device 300.

The UAV interface 306 may include mechanical and/or electrical coupling points for coupling the docking device 300 to a UAV, such as the UAV 200 described above. For example, the UAV interface 306 may include one or more mechanical latches to allow for a UAV to securely couple to the docking device 300. In addition, the UAV interface 306 may include one or more electrical connections to allow for wired communication between the docking device 300 and a UAV. The electrical connections may be associated with the one or more wired communication interfaces described above. In some embodiments, the UAV interface 306 is in electrical communication with the wired communication interface 308 to facilitate wired communication between the wired communication interface 308 and a docking device, via the UAV interface 306. The UAV interface 306 may also include power connections to allow for a battery on the UAV to be charged via the docking device 300.

In some embodiments, the docking device control interface 310 includes one or more motors, actuators, or other devices that allow the docking device 300 to be moved. For example, the docking device control interface 310 may be configured to articulate the docking device 300 in multiple axes of motion. For example, the docking device control interface 310 may control the docking device 300 to rotate, pan, and/or tilt. In other embodiments, the docking device control interface 310 controls the docking device 300 in fewer or more axes of motion. In some embodiments, the docking device control interface 310 may control the docking device 300 based on commands received via the wireless communication interface 304 and/or the wired communication interface 308. In further embodiments, the docking device control interface 310 may be configured to control the docking device 300 based on commands received from a docked UAV, via the UAV interface 306.

As described above, the memory 314 may be configured to store various processes, layers, and modules, which may be executed by the electronic processor 312 and/or the processing circuit 302. In one embodiment, the memory 314 includes a collaboration profile library 316. The collaboration profile library 316 contains different collaboration profiles for various UAVs and their associated organizations. In some embodiments, the collaboration profiles are associated with an identity element of a UAV. The collaboration profiles may determine what level of access a docked UAV may have to various resources associated with the docking device 300 and/or an organization associated with the docking device 300, such as additional processing power, data analytics, audio analytics, video/image analytics, communication bandwidth, power, software/firmware updates for the UAV, bulk upload/download capability, etc. While shown as included in the memory 314 of the docking device 300, the collaboration profile library 316 may be stored externally (for example, at the primary organization), and accessed via the wireless communication interface 304 and/or the wired communication interface 308.

The memory 314 may further include a UAV interface module 318. The UAV interface module 318 may be configured to allow the docking device 300 to control one or more aspects of a UAV docked to the docking device. For example, the UAV interface module 318 may allow the docking device 300 to control a camera of the UAV, access one or more data files in the UAV, etc. In some embodiments, the UAV interface module 318 communicates with a docked UAV via the UAV interface 306. In other embodiments, the UAV interface module 318 may be configured to allow the UAV 200 to control one or more aspects of the docking device 300. For example, the UAV may control movement of the docking device 300 to allow for different fields of view for a camera associated with the UAV. In further examples, the UAV may control various other communications or power transmissions of the docking device 300 via the UAV interface module 318. While not shown, it is understood that the memory 314 may include various other processes, modules, and layers to facilitate operation of the docking device 300, as needed.

Figure 4:
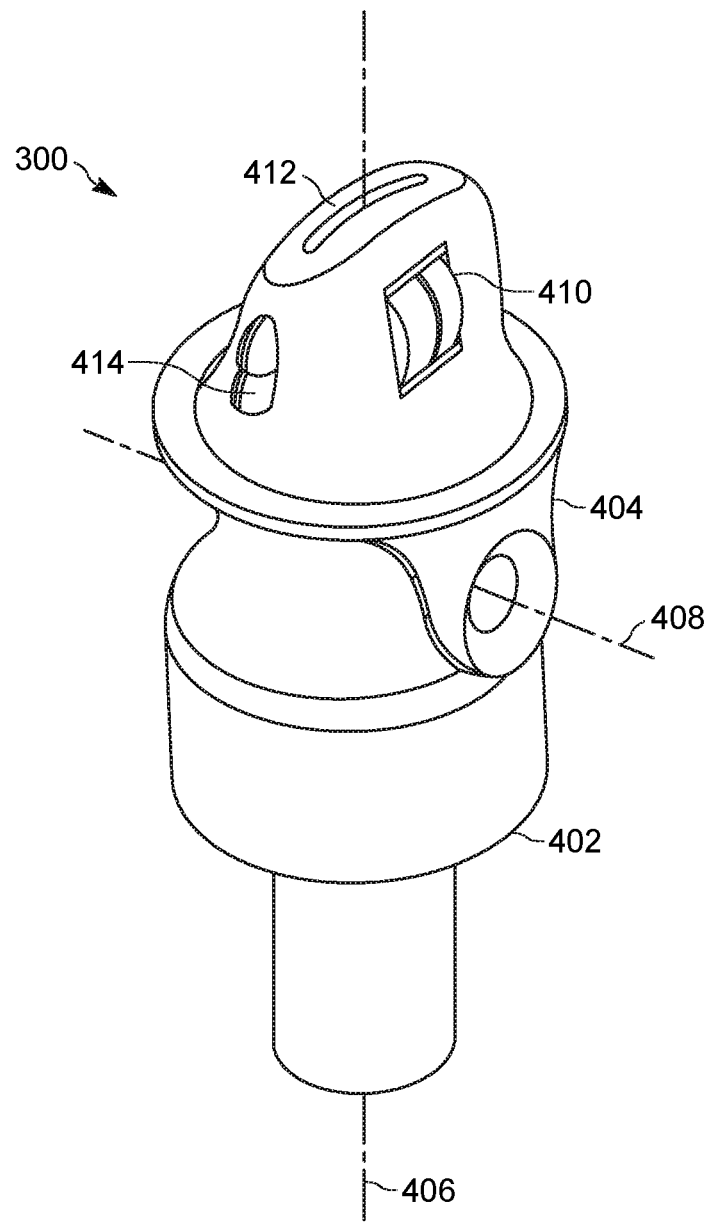
FIG. 4 is a perspective view of a dock device for a UAV, according to some embodiments.

Turning now to FIG. 4, a representation of the docking device 300 is shown, according to some embodiments. In one example, the docking device 300 includes a base portion 402 and a docking portion 404. The base portion 402 may include a processing circuit, such as processing circuit 302 described above. The base unit may further include the wireless communication interface 304, and the wired communication interface 308. The base portion 402 may further include provisioning for power which may be provided to the docking portion 404 and, when docked, to a UAV. The base portion 420 may further be coupled to a structure, such as a building or other structure to provide stability to the docking device 300.

The docking portion 404 may be configured to rotate about one or more axes to allow for maneuvering of a docked UAV. For example, the docking portion 404 may rotate about vertical axes 406, and pivot around a horizontal axis 408 to provide pan and tilt functionality to a UAV when attached to the docking portion 404. The docking portion 404 may further include one or more electrical connection points 410, 412 for providing power and data connections to a docked UAV. Further, the docking portion 404 may include one or more mechanical coupling points 414 to secure a UAV to the docking portion 404.

Figure 5:
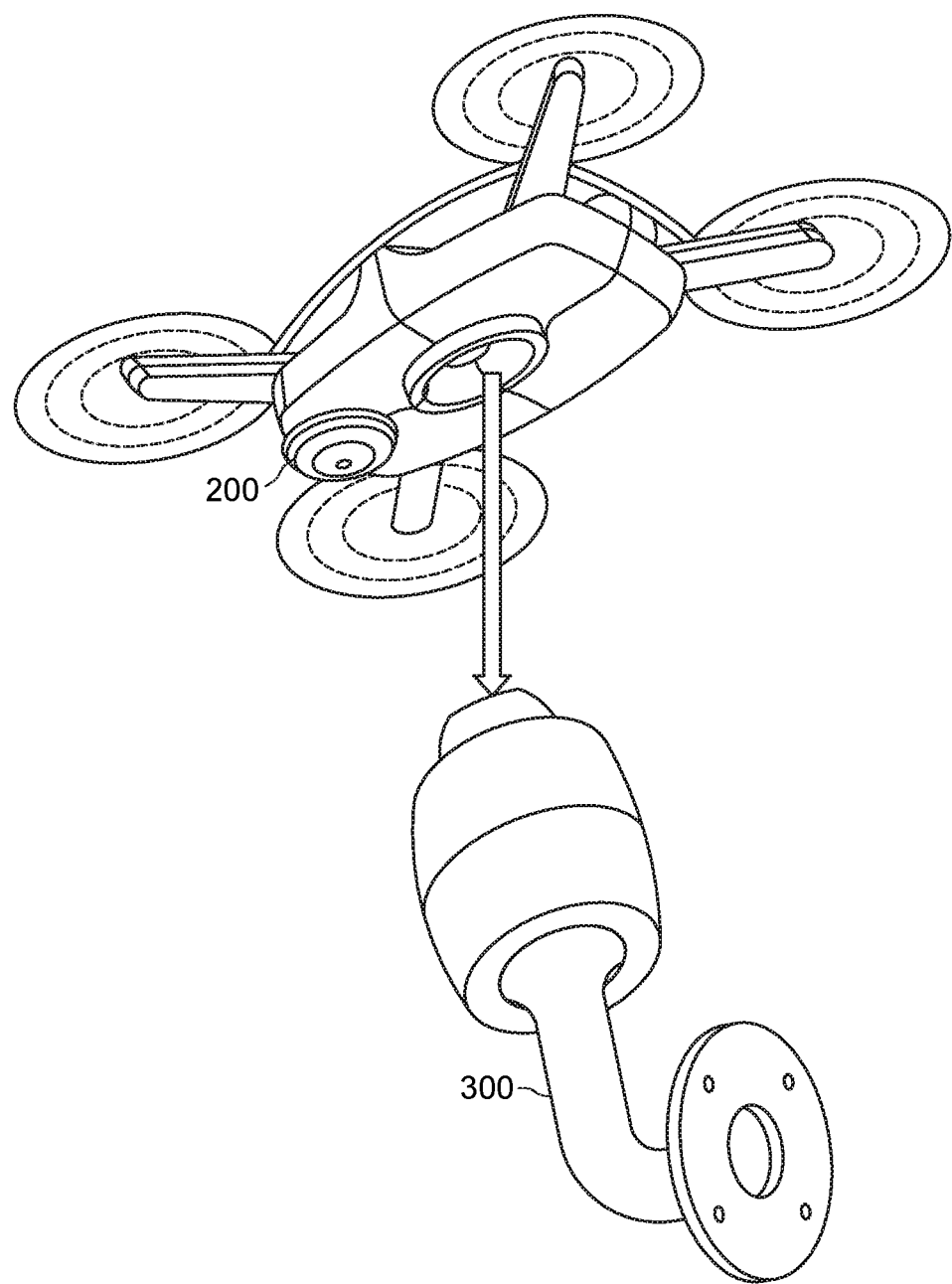
FIG. 5 illustrates a physical coupling of a UAV to a docking device, according to some embodiments.

FIG. 5 illustrates a UAV, such as UAV 200 in the process of docking with docking device 300. In one example, the UAV 200 includes a conical docking portion 500. The conical docking portion 500 may be configured to mate with a conical protrusion 502 on the docking device 300. The use of complementary conical docking portions helps ensure proper alignment during the docking process. While the docking device 300 shown in FIG. 5 shows corresponding conical mating portions on the UAV 200 and the docking device 300, other shapes and configurations are also contemplated.

Figure 6:
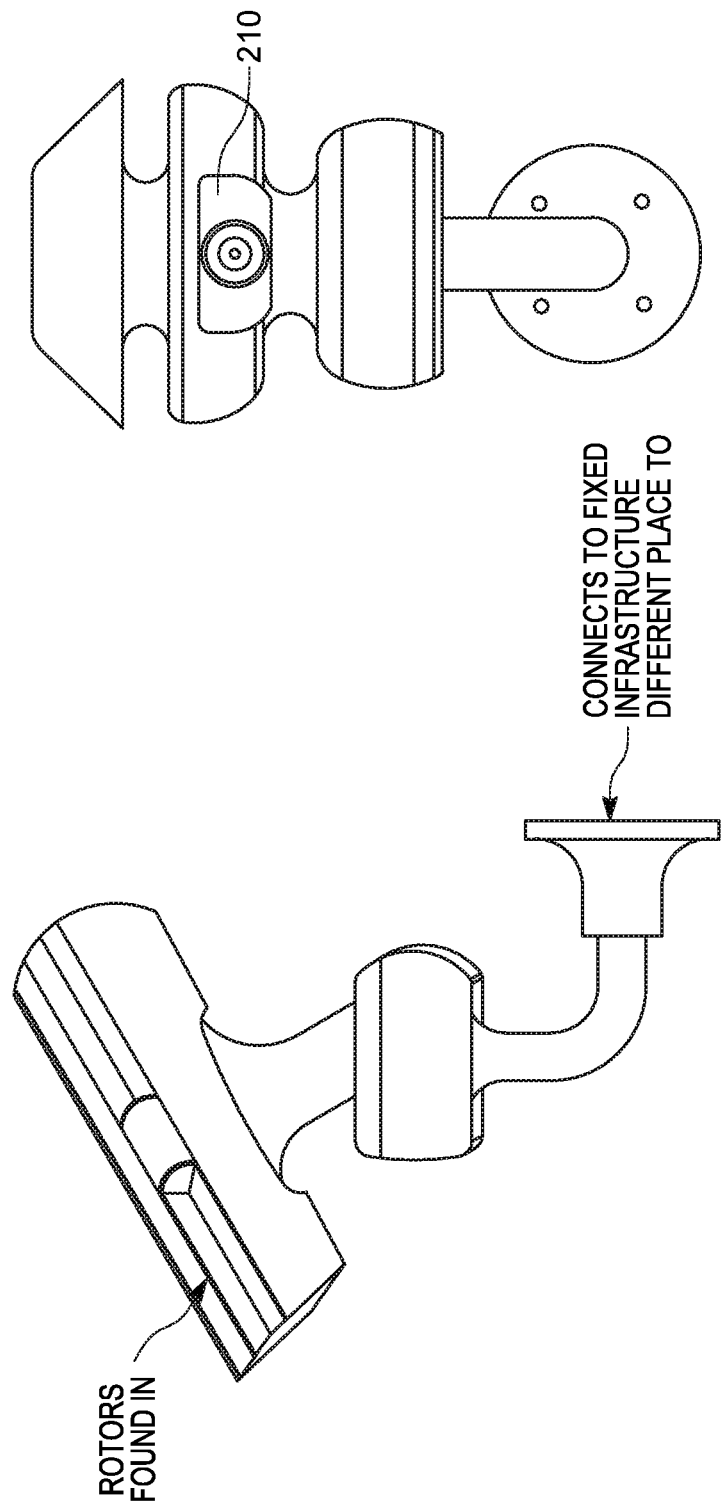
FIG. 6 illustrates a configuration of a UAV after coupling to a docking device, according to some embodiments.

FIG. 6 illustrates the UAV 200 coupled to the docking device 300. As shown in FIG. 6, the UAV 200 is configured to fold in one or more rotors to reduce the footprint of the UAV 200. Further, the UAV 200 of FIG. 6 is shown with the camera 210 visible, thereby allowing the UAV 200 to maintain use of the camera 210 when docked.

Figure 7:
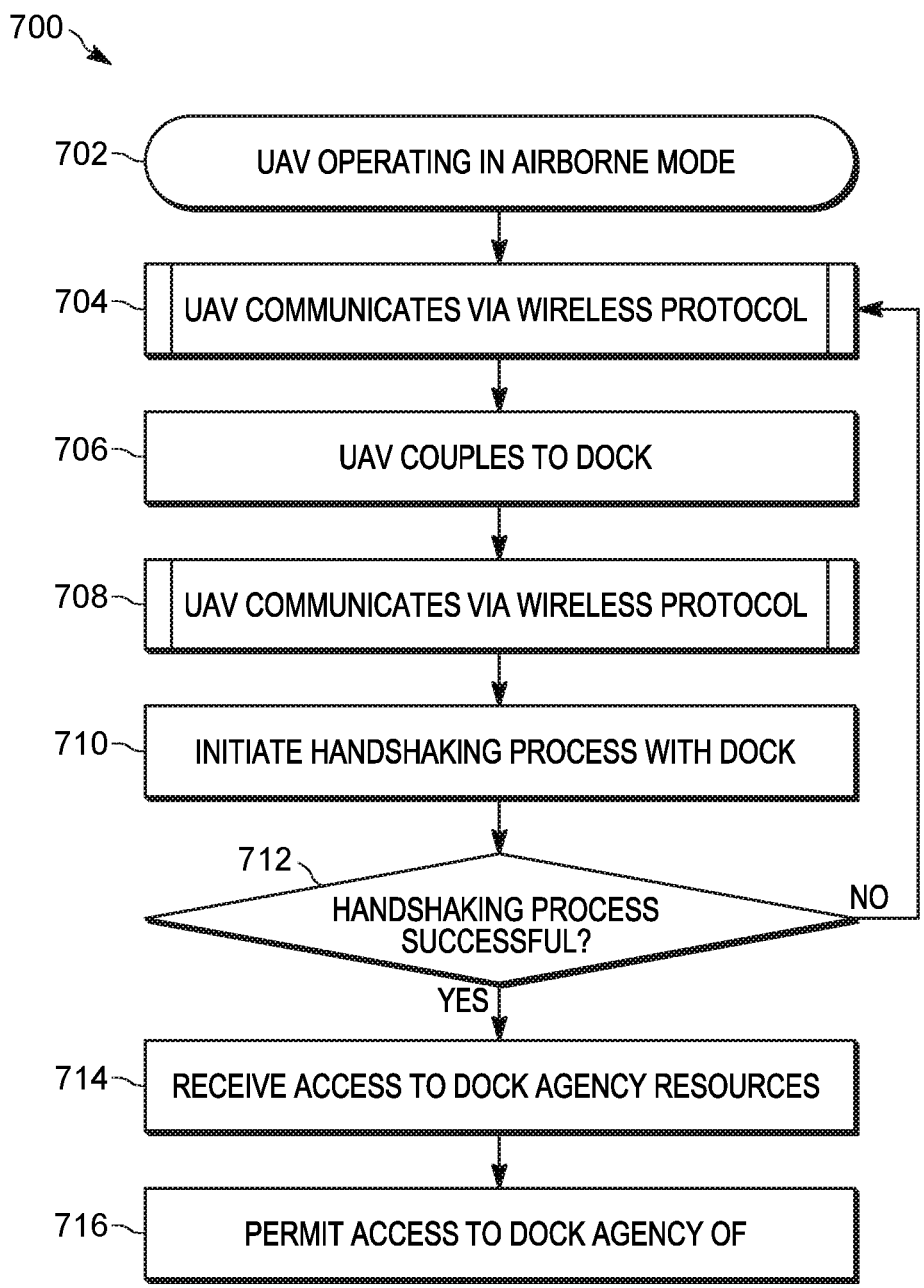
FIG. 7 is a flow chart illustrating a docking process for a UAV, according to some embodiments.

FIG. 7 is a flow chart illustrating a docking process 700 for docking a UAV, such as UAV 200, to a docking device, such as docking device 300. While references are made to UAV 200 and docking device 300, it is understood that the process 700 could be utilized by other UAVs and docking devices, as described herein. The process 700 may be performed via the processing circuit 202 in communication with other components of the UAV 200, such wireless communication interface 204, the dock interface 206, and the wired communication interface 208.

At process block 702, the UAV 200 operates in an airborne mode, indicating that the UAV is not docked and is being operated to fly over a geographical area. When in the airborne mode, the UAV 200 communicates via a wireless protocol, such as those described above, with various other devices as shown in process block 704. For example, the UAV 200 may communicate with an organization (for example, a control or command center associated with the organization), other UAVs, one or more docking devices, and/or various remote devices associated with various users and/or organizations. The UAV 200 may communicate to one or more of the above devices directly or via a repeater or other communication node. At process block 706, the UAV 200 couples to a docking device 300. As described above, coupling to the docking device 300 may include both a mechanical coupling and an electrical coupling.

Once the UAV 200 has successfully coupled to the docking device 300, the UAV 200 may communicate with the docking device 300 at process block 708. In one embodiment, the UAV 200 may communication with the docking device 300 via a wired protocol, such as those described above. In some embodiments, the UAV 200 communicates via the wired communication interface 208. Once wired communication has been established with the docking device 300, the UAV 200 may initiate a handshaking process with the docking device 300 at process block 710. The handshaking process will be described in more detail below. Whether the handshake process was successful is determined at process block 712. If the handshaking process was not successful, the UAV 200 returns to communicating via the wireless protocol at process block 704.

If the handshaking process is determined to be successful, the UAV may receive access to one or more resources offered by the organization associated with the docking device at process block 714. Resources may include power for charging the UAV 200, processor access to provide additional processing power to the UAV, high speed communications, etc. In some examples, processing resources provided to the UAV 200 may be used for image or data processing, which would be burdensome on, or impossible for, the onboard processor of the UAV 200. Off-loading processing allows data to be processed more quickly than would be possible by the UAV processing the data using onboard electronic processors. Similarly, high speed communication resources may allow the UAV 200 to transfer large amounts of data from on-board memory 214 to external devices, such as organizations, cloud-based servers, etc. This data transfer may be quicker than what may be achieved via a wireless transmission from the UAV 200. Further, by transferring data via a wired connection when coupled to the docking device 300, the UAV is not expending unnecessary resources (for example, bandwidth and battery power), which could be used to extend operating time of the UAV 200 when it is not coupled to a docking device 300. Further, by providing wired communication capabilities, costs may be reduced for an operator of a UAV due to reduced usage of one or more wireless networks' bandwidth. While process 700 shows those resources are only provided to the UAV upon a successful handshake, certain limited resources, such as power for charging a battery of the UAV 200 may be made available even when a handshake is not successful. However, in other example, if no handshake is successful, then no resources at all may be provided to the UAV 200.

At process block 716, the UAV permits access to one or more resources of the UAV 200 to the organization associated with the docking device 300. For example, the UAV 200 may allow the organization access to the camera 210 of the UAV 200. In some embodiments, access to the camera 210 may include both access to the camera feed, as well as basic control over the camera 210, such as a zoom function. This may supplement the capability of the organization without having to build out additional infrastructure (for example, additional cameras).

Figure 8:
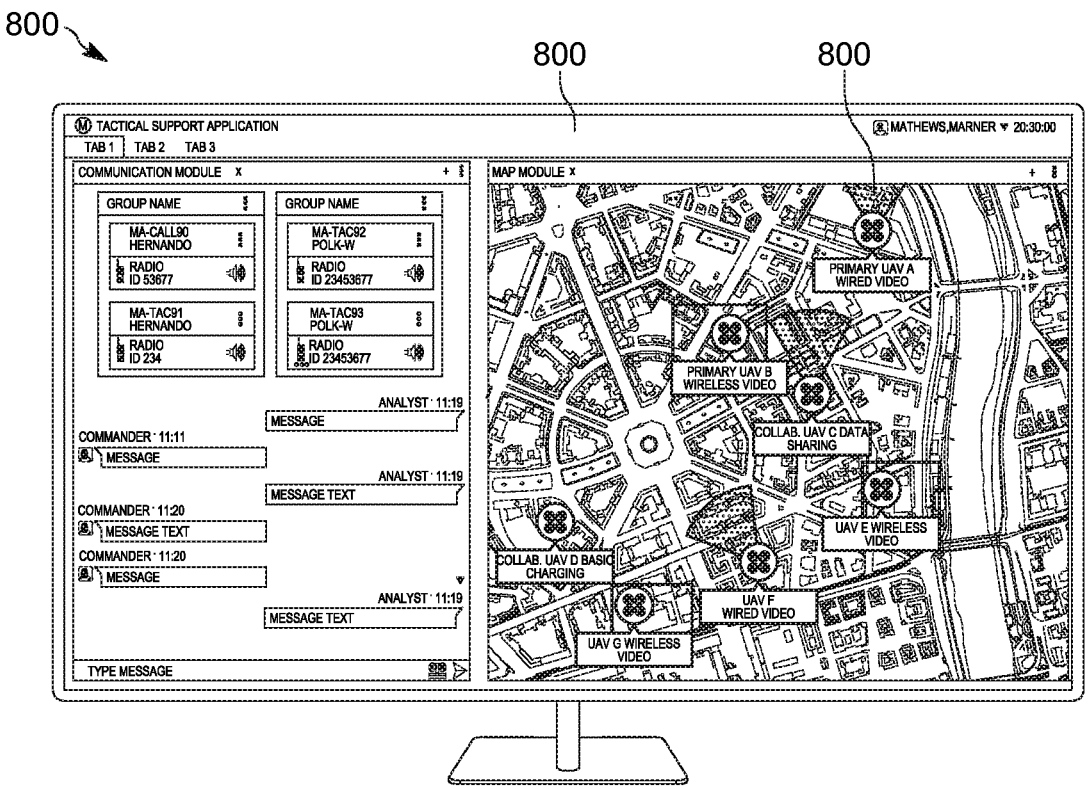
FIG. 8 is a flow chart illustrating a multi-agency docking process for a UAV, according to some embodiments.
Figure 8:
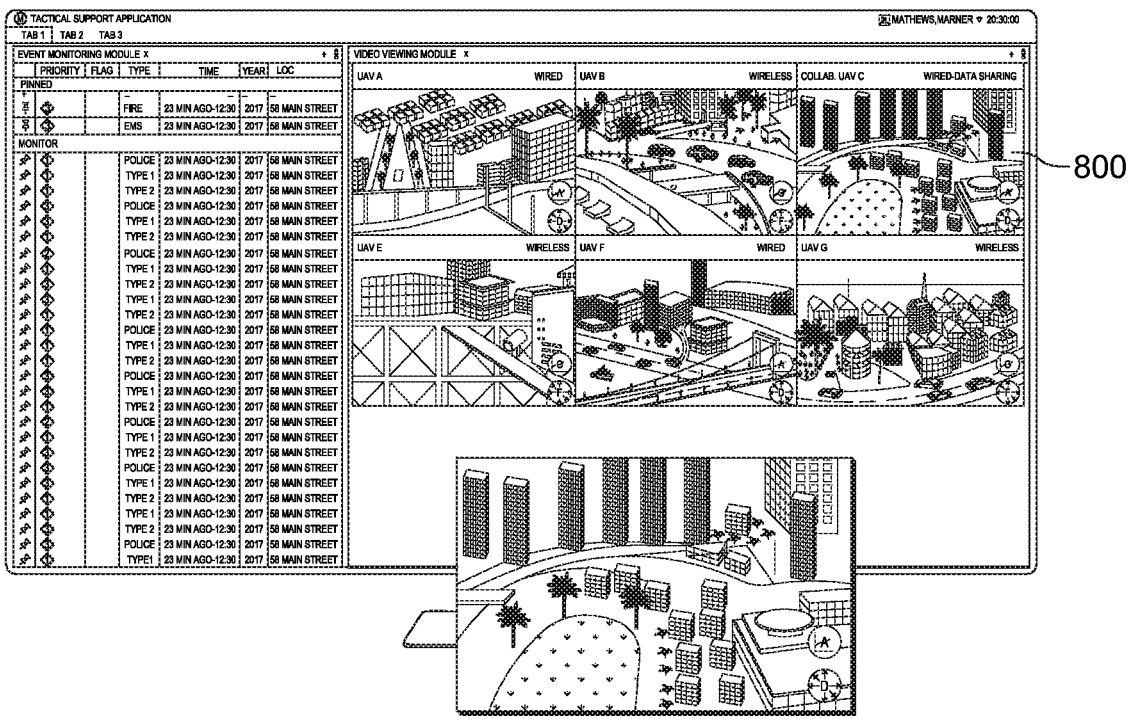

Turning now to FIG. 8, a monitoring system 800 of an organization associated with the docking device 300, such as primary organization 112 described above, is shown. A location display 802 may provide a location of a number of docking device 300 associated with the organization. In some embodiments, when a UAV 200 is docked with a docking device 300 and has allowed the organization access to the camera 210, the location display 802 may show a field of view of the camera 210, such as shown in a first camera view 804. As described above, the organization may be able to modify the field of view of the camera 210 associated with the UAV 200 by panning or tilting a portion of the associated docking device 300. Further, the organization may, in some embodiments, control a zoom function of the camera 210 as well. Monitoring system 800 further include imaging display 806, which is configured to display a number of views provided by one or more UAVs 200 coupled to docking devices 300 associated with the organization. In some embodiments, the monitoring system 800 may provide visual indications showing whether a specific UAV, such as UAV 200 is docked. The monitoring system 800 may further provide visual indications showing what agency or organization a docked UAV is associated with (for example, primary or secondary organizations. In some embodiments, these visual indications may be provide based on metadata tags appended by the primary organization to data provided by a docked UAV, such as the metadata described above.

Figure 9:
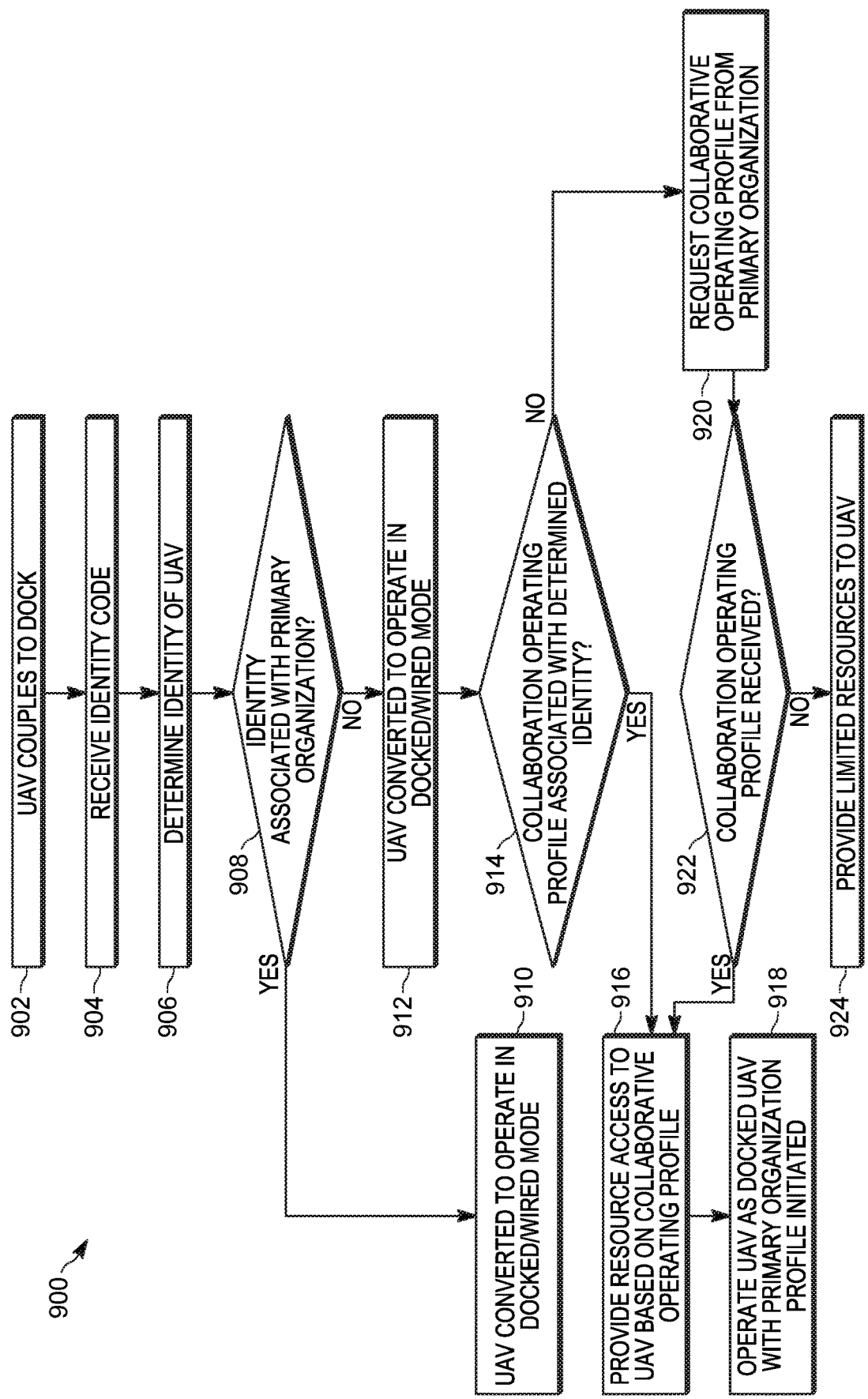
FIG. 9 illustrates a tactical support application of an organization associated with one or more UAVs.

Turning now to FIG. 9, a process 900 for coupling a UAV to a docking device of an organization is shown. Process 900 may be used to allow for UAVs associated with multiple organizations to utilize a docking station of other organizations. For purposes of clarity and brevity, references will be made to UAV 200 and docking device 300, and their associated components as described above. While references are made to UAV 200 and docking device 300, it is understood that the process 900 could be utilized by other UAVs and docking devices as described herein.

At process block 902, the UAV 200 couples to the docking device 300. As described above, coupling to the docking device 300 may include both mechanical and electrical coupling. Once the UAV 200 has fully coupled to the docking device 300, the docking device 300 received an identity code from the UAV 200. In one embodiment, the identity code may be the identity element 216 described above. In one embodiment, the UAV 200 transmits the identity code to the docking device 300 via the wired communication interface 208. In other embodiments, the identity code may be received wirelessly. In still further examples, the UAV 200 may have or include one or more machine-recognizable visible or non-visible spectrum markings which may be read by one or more sensors of the docking device 300 for determining an identity code of the UAV 200. Example machine-recognizable markings could include 2D bar codes, 3D QR codes, etc.

At process block 906, the docking device 300 determines an identity of the UAV 200. In some embodiments, the docking device 300 may transmit the identity code to the organization associated with the docking device 300 to determine the identity of the UAV 200. In some embodiments, the docking device 300 and/or the organization may access a database to determine the identity of the UAV 200. At process block 908, the docking device 300 and/or the organization determines if the identity of the UAV 200 is associated with a primary organization. In one embodiment, the primary organization is the organization associated with or in charge of the docking device 300. However, in other embodiments, the primary organization may have a relationship with the owner of the docking device 300.

If the identity of the UAV 200 is determined to be associated with the primary organization at process block 908, the docking device 300 instructs the UAV 200 to operate in a docked/wired mode at process block 910. When in the docked/wired mode, a "wired/secured" metadata tag may be applied to data transmitted by the UAV 200, and the UAV 200 communicates only via the wired communication interface 208. Also, location sharing may be enabled (that is, the UAV's location becomes associated with the known location of the docking device 300.) In some embodiments, precise location data of the UAV 200 (known due to the fixed location of the docking device 300) may be enabled and provided to the organization associated with the UAV 200, and/or one or more other organizations that have access to the primary organization's resources. Further, the primary organization is provided with access to the camera 210 of the UAV 200, and may control the zoom of the camera 210 of the UAV 200, as well as control pan and tilt motions via the docking device 300, as described above. Further resources may be provided to the UAV 200 once it is determined to be associated with the primary organization. Additionally, other resources such as data analytics, video/image analytics, and audio analytics using the additional processing power of the docking device 300 and/or the primary organization, as well as high speed data transfers, and power may be provided to the UAV 200 upon being determined to be associated with the primary organization.

If the identity of the UAV 200 is determined to not be associated with the primary organization at process block 908 (i.e. the UAV 200 is determined to be associated with a secondary—or other—organization), the docking device 300 accesses a collaborative operating profile associated with the determined identification of the UAV 200 at process block 912. For example, where the UAV is determined to be associated with a secondary organization, the docking device 300 accesses, or attempts to access, a collaborative operating profile associated with the secondary organization. In some embodiments, the collaborative operating profile may be stored in the docking device 300, such as in the memory 314. In other embodiments, the collaborative operating profile may be accessed by the docking device 300 from a remote location, such as the primary organization and/or a cloud-based server.

The collaborative operating profile includes one or more parameters associated with the identified UAV 200 that indicate what, if any resources may be provided to the UAV 200. In one embodiment, the docking device 300 and/or primary organization provides resource access to the UAV 200 based on the collaborative operating profiles. The collaborative operating profiles may be developed based on the relationship of the organization associated with the UAV 200 to the primary organization associated with the docking device 300. For example, where the primary organization is a police department, the police department may have an agreement with the fire department which covers the same geographical area as the police department. Thus, UAVs identified as belonging to the fire department may be allowed to access the full resources of the police department based on the collaborative operating profiles put in place. In other embodiments, the collaborative operating profile may restrict access to resources for some UAVs 200 associated with other organizations. For example, UAVs 200 associated with private security organizations, or public security organizations from different locations or agency types (for example, federal vs. state) may include restrictions on what resources of the primary organization may be accessed. The collaborative operating profile may be defined by both the primary organization and the collaborating/secondary organization.

At process block 914, it is determined whether a collaborative operating profile is associated with the identity of the UAV 200. If there is a collaborative operating profile associated with the identity of the UAV 200, the docking device 300 provides the UAV 200 with access to resources based on the associated collaborative operating profile, at process block 916. As described above, resources may include power (DC, AC, etc.) for use of recharging a UAV, high-speed data connections (for example, increased bandwidth), wired/secured metadata tags appended to data transmitted via the wired communication interface 208 of the UAV 200 for verification of data, software and/or firmware updates for the UAV 200, bulk uploads and/or downloads, and dock-accessible analytics (for example, using the additional processing power of the docking device 300). Further, motion control of the UAV 200 via the docking device 300 may be provided to the organization associated with the UAV 200, along with the ability to view the images captured by the camera 210 of the UAV 200.

Additionally, access to certain features of the UAV 200 may be provided to the primary organization at process block 918 based on the collaborative operating profile. For example, the primary organization may be provided with access to data obtained by the UAV 200. In some embodiments, the data may be constrained to sharing data related to particular incidents, time frames, locations, etc. Further, the primary organization may be allowed access to the camera 210 of the UAV 200. Access may be determined by the collaborative operating profile, and may allow only viewing, or control (for example, zoom). Further, the primary organization may further control the orientation of the camera 210 via the pan and tilt capabilities of the docking device 300. In some embodiments either the primary organization or the organization associated with the UAV 200 may have priority when controlling the orientation of the camera 210 based on the collaborative operating profile.

Returning now to process block 914, if it is determined that there is not a collaborative operating profile associated with the UAV 200, the UAV 200 may request a collaborative operating profile from the primary organization at process block 920. In some embodiments, the request for a collaborative operating profile may be sent to the primary organization via the wired communication interface 208. Alternatively, the primary organization may, upon determining that no collaborative operating profile exists for the UAV 200, request a collaborative profile from the organization associated with the UAV 200. The primary organization may then communicate the request to the organization associated with the UAV 200. The primary organization and the organization associated with the UAV 200 may then negotiate whether a collaborative operating profile should be created for the UAV 200. The determination may be made based on multiple parameters, such as existing relationship between the organizations, authority of the organizations (for example, federal vs. state; public vs. private), preexisting agreements between the organizations, and the like.

At process block 922, if the collaboration operating profile is created for the UAV 200, the docking device 300 provides resource access to the UAV 200 based on the associated collaborative operating profile, at process block 916 (as described above). If the collaborative operating profile is not received, the access to resources is restricted by the docking device 300 at process block 924. In some embodiments, no resources are provided to the UAV 200 where no collaborative operating profile is associated with the UAV 200. In other embodiments, limited resources, such as making power available to charge the UAV 200 may be provided to the UAV 200, even when no collaborative operating profile is available.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for docking an unmanned aerial vehicle ("UAV") equipped with a wireless communications system; the method comprising:
  coupling the UAV to a docking device that is configured to provide power and data communication to the UAV via a physical interface;

after coupling, receiving, at a docking device controller, an identity of the UAV;
after coupling, determining, based on the identity of the UAV, an organization associated with the UAV;
after coupling, accessing, via the docking device controller, a collaborative operating profile associated with the determined organization and the identity of the UAV; and
after coupling, providing access to one or more resources associated with the docking station based on the collaborative operating profile.

2. The method of claim 1, wherein the one or more resources are selected from the group consisting of increased bandwidth access, bulk upload/download capability, software/firmware for the UAV, and power for charging the UAV.

3. The method of claim 1, further comprising controlling a camera coupled to the UAV, via the docking device controller, based on the operating profile.

4. The method of claim 3, wherein controlling the camera comprises controlling a zoom operation of the camera.

5. The method of claim 3, further comprising articulating a portion of the docking device physically coupled to the UAV to change the physical position of the UAV in order to provide a panning operation and a tilting operation of the camera coupled to the UAV.

6. The method of claim 1, further comprising:
receiving, at the docking device, a message indicating that a collaborative operating profile does not exist for the UAV;
transmitting a request to the organization associated with the UAV to supply a collaborative operating profile; and
restricting access to the one or more resources based on the message indicating that the collaborative operating profile does not exist.

7. The method of claim 1, further comprising configuring the UAV to operate in a wired transmission mode based on the collaborative operating profile.

8. The method of claim 7, wherein data transmitted via the wired transmission mode is appended with metadata, the metadata providing an indication that the data was transmitted via a wired network.

9. A docking device for providing power and data communication to an unmanned aerial vehicle ("UAV") equipped with a wireless communication system, the docking device comprising:
a base portion;
a dock portion movably coupled to the base portion and comprising:
a mechanical latch for physically coupling the UAV to the docking device; and
a plurality of electrical connections configured to interface with corresponding electrical connections on the UAV, wherein the electrical connections comprise power connections and data connections; and
an electronic processor, the electronic processor configured to:
receive an identity of the UAV via the data connections in response to the UAV being physically coupled to the docking device;
determine, based on the received identity of the UAV, an organization associated with the UAV;
access a collaborative operating profile associated with the determined organization and the received identity of the UAV; and
provide access to one or more resources associated with the docking station based on the collaborative operating profile.

10. The docking device of claim 9, wherein the one or more resources are selected from the group consisting of increased bandwidth access, bulk upload/download capability, power for charging the UAV, and data analytics.

11. The docking device of claim 9, wherein the docking device is in electronic communication with a docking device organization.

12. The docking device of claim 11, wherein the docking device is configured to:
access a camera of the UAV; and
transmit data generated by the camera to the docking device organization based on the collaborative operating profile.

13. The docking device of claim 12, wherein the docking device organization is configured to provide a level of access to the transmitted data to the organization associated with the UAV based on the collaborative operating profile.

14. The docking device of claim 12, wherein the dock portion of the docking device is configured to move in a vertical and a horizontal direction relative to the base portion to change the physical position of the UAV in order to provide a panning and a tilting operation of the camera coupled to the UAV.

15. The docking device of claim 9, wherein the electronic processor is further configured to:
receive a message indicating that a collaborative operating profile does not exist for the UAV;
transmit a request to the organization associated with the UAV to supply a collaborative operating profile; and
restrict access to the one or more resources based on the message indicating that the collaborative operating profile does not exist.

16. The docking device of claim 15, wherein the electronic processor is further configured to:
receive a new collaborative profile in response to the transmitted request; and
modify access to the one or more resources based on the new collaborative profile.

17. A method for docking unmanned aerial vehicles ("UAV") associated with multiple organizations on a dock network; the method comprising:
coupling a UAV to a docking device associated with a first organization;
after coupling, receiving, at a docking device controller, an identity of the UAV;
after coupling, determining, based on the identity of the UAV, an organization associated with the UAV; and
after coupling, providing access to resources associated with the first organization to the UAV based on the determined identity of the UAV.

18. The method of claim 17, further comprising:
converting the UAV to operate in a wired mode based on determining the identity of the UAV is associated with the first organization; and
providing access to the first organization of all data associated with the UAV.

19. The method of claim 17, further comprising:
accessing, via the docking device controller, a collaborative operating profile based upon determining the identity of the UAV is associated with a second organization, wherein the collaborative operating profile is associated with the second organization; and
limiting access to the resources based on the collaborative operating profile.

20. The method of claim 17, wherein the resources are selected from the group consisting of increased bandwidth access, bulk upload/download capability, software/firmware updates for the UAV, and power for charging the UAV.

\* \* \* \* \*